United States Patent [19]

Gillette

[11] 4,080,724

[45] Mar. 28, 1978

[54] METHOD OF FORMING ELECTRICAL MACHINE CARE FROM E-LAMINATIONS

[75] Inventor: Willard D. Gillette, Brunswick, Me.

[73] Assignee: Zephyr Wind Dynamo Company, Brunswick, Me.

[21] Appl. No.: 648,815

[22] Filed: Jan. 13, 1976

[51] Int. Cl.² .......................................... H02K 15/02
[52] U.S. Cl. ...................................... 29/598; 29/596; 29/609; 310/42; 310/216; 310/217
[58] Field of Search ........................ 29/596, 598, 609; 310/42, 43, 216, 217, 218, 259, 261

[56] References Cited

U.S. PATENT DOCUMENTS

| 2,446,999 | 8/1948 | Camilli | 29/609 X |
| 2,937,408 | 5/1960 | Limpel | 29/596 X |
| 3,043,971 | 7/1962 | Stevens | 29/609 X |
| 3,787,744 | 1/1974 | Saito | 310/217 |

Primary Examiner—Carl E. Hall
Attorney, Agent, or Firm—Clarence A. O'Brien; Harvey B. Jacobson

[57] ABSTRACT

The use of E-shaped transformer laminations in rotating electrical machinery in which the E-laminations are modified and assembled in a stacked manner and fixedly secured in rigid relationship to form a stator or rotor core receiving appropriate windings encapsulated by hardenable material to produce a stator or rotor for rotating electrical machinery at a relatively low cost with maximum engineering flexibility, lightweight construction and efficient operation. One utility of the novel use is in the construction of low speed alternators such as a wind-driven assembly for producing electrical energy.

6 Claims, 7 Drawing Figures

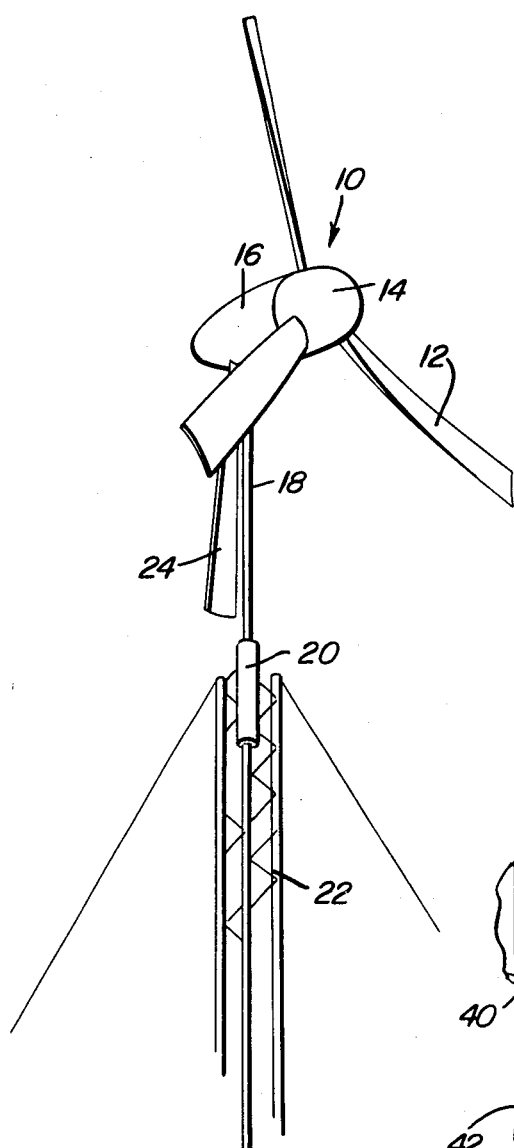
Fig. 1
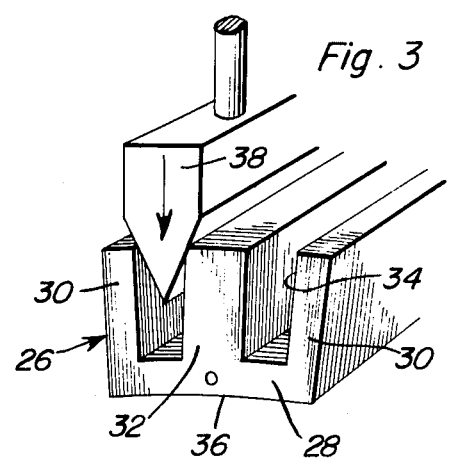
Fig. 2
Fig. 3
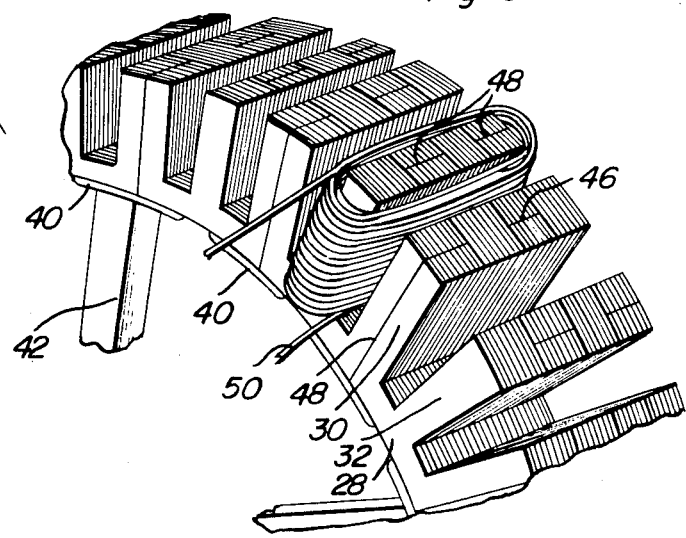
Fig. 5

4,080,724

METHOD OF FORMING ELECTRICAL MACHINE CARE FROM E-LAMINATIONS

BACKGROUND OF THE INVENTION

1. Field of the Invention

The present invention generally relates to the construction of either both the rotor and stator of rotating electrical machinery, such as alternators, motors and the like utilizing E-laminations, normally used in transformer construction, which have been modified by spreading or closing the outer legs of the E-laminations and then assembling the laminations in stacked relationships, rigidly securing the laminations in position, assembling coil windings on the lamination which define cores for the winding and then encapsulating the laminations and coil windings in a hardenable material such as epoxy or the like.

2. Description of the Prior Art

Various rotating electrical machinery employs the use of a stator and rotor which are concentrically arranged in which the stator or rotor may be oriented interiorly of the other. Such devices employ metallic cores and coil windings in a known manner with the cores normally being specially constructed and, in some instances, being assembled from a plurality of preformed laminations all of which result in such devices being relatively expensive to manufacture.

SUMMARY OF THE INVENTION

An object of the present invention is to provide a novel and unique use of E-laminations, such as those normally employed in transformer construction, which requires the modification of such laminations, assembly of the laminations in a stacked condition, rigidly securing the laminations in position, applying coil windings thereto and encapsulating the assembled laminations and coil windings in an insulating material.

Another object of the invention is to provide a stator or rotor employed in rotating electrical machinery constructed of E-laminations in which the assembled laminations and coil windings are encapsulated by a centrifugal molding technique in which the stator or rotor is rotated along with a mold assembly to enable hardenable epoxy material or the like to be deployed into the mold and retained in encapsulating relation to the annular rotor or stator while it and the mold is being rotated and the epoxy material is setting or hardening.

A further object of the invention is to provide a novel and unique use of E-laminations in accordance with the preceding objects in which the slots defining the legs of the laminations may be spread apart or closed to enable various diameters to be formed from laminations having a given size slot with it being pointed out that E-laminations of various sizes or slots are available commercially and E-laminations having different alloys with different magnetic characteristics also being available for allowing maximum flexibility in constructing a rotating electrical device at a minimum cost and with maximum efficiency of construction.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a wind-driven dynamo or generator employing a rotating electrical machine incorporating the novel and unique use of E-laminations in the construction thereof.

FIG. 2 is a plan view of an E-lamination in its commercially available form and which is used in the construction of transformers.

FIG. 3 is a schematic plan view illustrating the manner in which the legs of the E-laminations are spread apart thus increasing the dimensions of the outer ends of the slots and arcuately deforming the web portion of the E-lamination.

FIG. 5 is a fragmental perspective view illustrating the installation of a coil winding and also the manner of interleaving the laminations.

DESCRIPTION OF THE PREFERRED EMBODIMENT

Figure 4:
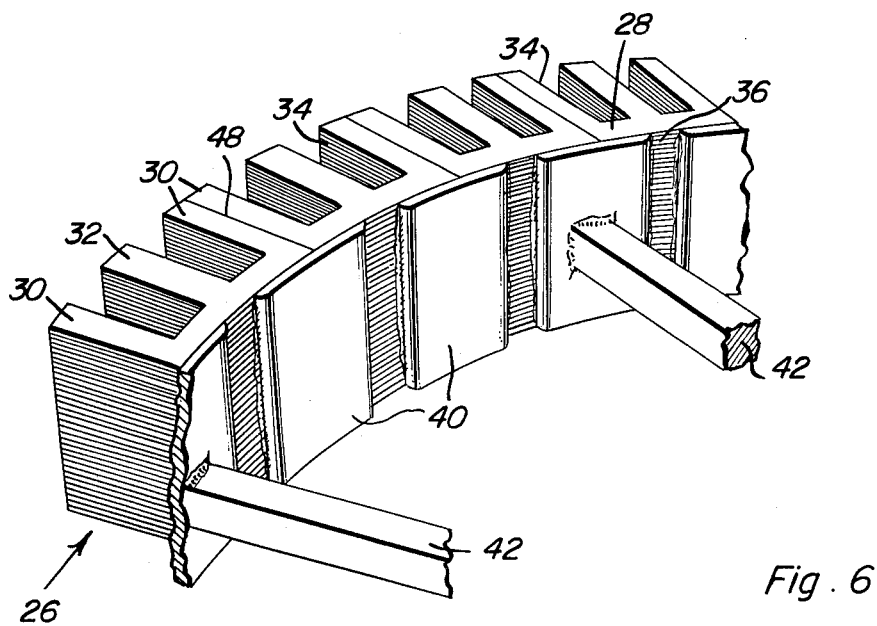
FIG. 4 illustrates the manner in which a plurality of stacked, modified E-laminations have been rigidly assembled to form a core of a rotor or stator.

FIG. 1 illustrates a wind-driven device 10 in the form of an alternator or generator for producing electrical energy when the wind rotates a rotor having a plurality of blades 12 connected thereto with the rotor hub 14 and the blades 12 being rigidly connected in any suitable manner and the rotor being journaled in an association with a stator having a housing 16 supported from a vertical support shaft 18 journaled for swiveling movement about a vertical axis so that the bladed rotor may be properly related to the wind direction. The vertical shaft 18 is swivelly supported in a sleeve 20 at the upper end of a supporting tower or other structure 22. The housing 16 and rotor hub 14 are of a shape simulating a teardrop with the rotor hub 14 being preferably downstream from the housing 16 so that the bladed rotor will serve as its own stabilizing fin for maintaining the blade rotor properly related to the wind direction. The housing 16 is provided with a rigid, depending blade 24 in the form of an airfoil which is so related to the housing 16 that when the wind velocity exceeds a predetermined speed, the airfoil blade 24 will exert torque on the housing 16 to cause it to swing partially about the vertical axis of the shaft 18 and sleeve 20 so that the bladed rotor will pivot out of the wind and thereby protect itself from damage due to over-speeding which could occur if wind velocity exceeded a predetermined maximum. Of course, when the wind velocity subsides, the force produced by the airfoil blade 24 will be less and the bladed rotor will re-assume its position for maximum use of the wind.

The orientation of structural components illustrated in FIG. 1 exemplifies a use of E-shaped laminations generally designated by numeral 26 and illustrated in FIG. 2 and hereinafter called E-laminations. These laminations are constructed of various alloys to provide desired magnetic properties and are stacked into a laminated core for use in transformers and are commercially available with the end edges of the laminations being perpendicular to the side edges as illustrated in FIG. 2 with the laminations including a web or back portion 28, end legs 30 and a central leg 32 which is twice as wide as the end legs 30 with the spaces between the end legs 30 and the central leg 32 defining slots 34 having parallel edges.

In forming a circular stator or rotor, such as one to be employed in the dynamo 10 illustrated in FIG. 1, the E-laminations 26 must be modified which in this case, the web 28 is formed as an arc with the inner edge 36 thereof defining a segment of the periphery of the stator or rotor. This is accomplished by assembling a plurality of the E-laminations 26 in stacked aligned relation with clamping pressure being exerted on the ends thereof. A wedge-shaped member 38 is then inserted downwardly into each of the slots 34 while the clamping pressure is maintained to a predetermined degree to provide the inner edge 36 of the web or cross member 28 with the desired arcuate surface. Two wedge members 38 may be simultaneously inserted into the two slots or the wedges may be sequentially inserted. Thus, while the laminations are clampingly secured to prevent deflection of the legs of the laminations, the clamping pressure exerted on the laminations is not sufficient to prevent spreading of the slots 34 when the wedge members 38 are inserted to a predetermined extent. While FIG. 3 illustrates the E-laminations being spread, it is pointed out that the legs 30 of the E-laminations may also be closed by exerting pressure on the outer surfaces thereof while the laminations are clamped into the stacked arrangement.

Figure 6:
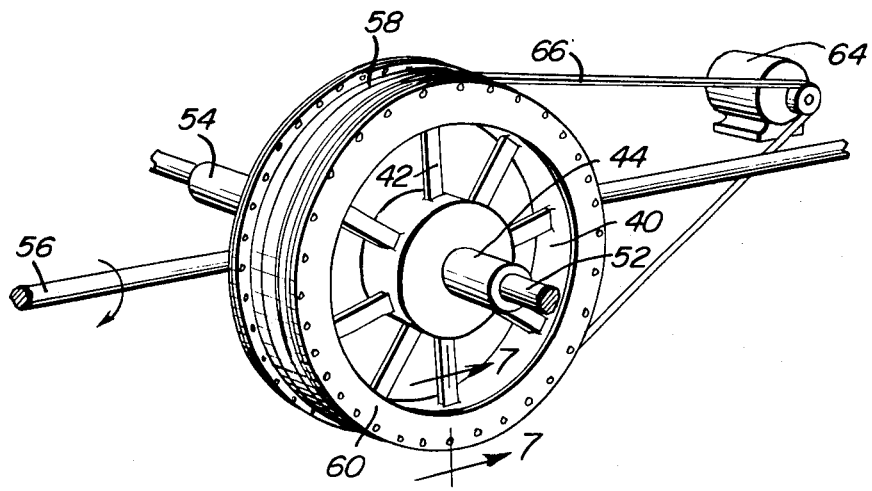
FIG. 6 is a schematic perspective view illustrating the manner in which the assembled laminations and coil windings on the stator or rotor is assembled with a mold all of which is rotated about a central axis.
Figure 7:
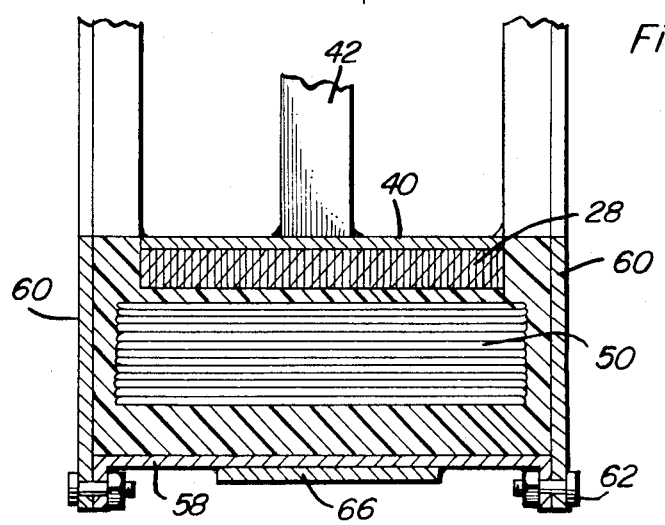
FIG. 7 is a transverse, sectional view taken substantially upon a plane passing along section 7—7 of FIG. 6 illustrating the structure of the mold and assembled stator or rotor and the epoxy material associated therewith.

The modified E-laminations, in their stacked relationship are rigidly secured in a predetermined relation to each other by backing plates 40 which are welded to the arcuate edges 36 of the E-laminates and the backing plates 40 are provided with rigid spokes 42 which are secured to a central hub such as hub 44 as illustrated in FIG. 6. The backing plates may be welded to the E-laminations or otherwise rigidly secured thereto and the laminations may be rigidly fixed to each other in other manners such as by bolting or potting with a plastic material such as epoxy and the like.

FIG. 5 illustrates the orientation of the assembled laminations in which the assembled stacks of E-laminations are interleaved. This is possible because the two outer legs 30 are half as wide as the center leg 32 so that when the E-laminations are secured together in end-to-end relation, the two joined outer legs have the same width as the center legs. Thus, by stacking a number of E-laminations at a time and building up the stator or rotor in the nature of laying bricks, an interleaf arrangement is obtained which is stronger than one with a continuous seam between the laminations. In other words, if all of the laminations were joined along a continuous seam from side edge to side edge of the stator or rotor as illustrated in FIG. 5, the seam between adjacent stacks of laminations around the periphery of that stator or rotor would be weaker than the staggered or interleaved arrangement as illustrated in FIG. 5 wherein the seams designated by numerals 46 and 48 between adjacent stacks of E-laminations are staggered. In view of the dimensional relationship of the outer legs and the center leg, the poles made up of two outer legs and a connecting seam are the same dimension as poles consisting of the center legs.

After the E-laminations have been assembled into a circular, annular configuration, coil windings 50 are wound around the cores in a well-known manner as illustrated in FIG. 5 with the coil windings being of desired characteristics required for the use for which the stator or rotor is intended. Various properties may be attained by varying the alloy of the E-laminations to vary the magnetic qualities thereof and by varying the number of convolutions of wire in the coil winding 50.

After assembly of the E-laminations and appropriate orientation and connection of the coil windings, the stator or rotor is then supported on a shaft 52 which journals the hub 44, spokes 42 and the stator or rotor for rotation about a horizontal axis. The shaft 52 may be journaled in a support 54 that in turn is supported by a shaft 56 perpendicular to shaft 52 which enables the tubular support 54 and the shaft 52 to be properly adjusted or orientated so that it is in true horizontal position or some other angular position if desired so that the shaft 52 may be either horizontal or angularly inclined which may be desired in some instances. A mold assembly is assembled with the stator or rotor and includes a peripheral cylindrical wall 58 and a pair of annular end plates 60 which are secured in assembled relation by a plurality of bolts 62. The interior of the form may be coated with some type of release material which will not adhere to epoxy potting material when it is poured into the open interior of the form or mold and due to centrifugal force resulting from rotation of the mold and stator or rotor, the epoxy material will be evenly distributed throughout the interior of the mold and completely encapsulate the E-laminations and coil windings so that when the epoxy potting material has hardened, the mold may be stopped and released. The mold is driven at any suitable speed by an electric motor or other drive means 64 as illustrated in FIG. 6 with a belt 66 encircling the mold in a well-known manner with the belt merely engaging the exterior of the mold or the mold may be provided with a suitable V-pulley thereon by virtue of which the mold may be rotated at a predetermined speed. Pivoting of the shaft 52 from a horizontal to an inclined or vertical position enables the potting material to be completely purged of air from the area which receives the material and after removal of the mold, the stator is complete except for possible minor trimming. During rotation of the mold and the stator, the stator's bearings are being used by virtue of the hub 44 being journaled on the shaft 42 which is actually non-rotatable insofar as rotation about its own axis is concerned.

By varying the degree of spreading or closing of the slots of the E-laminations, any diameter stator or rotor may be constructed and the use of "off-the-shelf" die cut pieces eliminates the expense of dies for every new design or production change and by controlling the bending, a tapered or conical surface can be achieved which allows for air gap adjustment by moving the rotor axially relative to the stator. And the thin backing of the E-laminations allows for very light weight stators or rotors as compared to conventional structures.

The use of the E-laminations in low speed alternators or motors enables a reduction in cost while maintaining high efficiency. The use of the E-laminations, heretofore intended for transformer core laminations, enables the process of modifying, by bending, the shape of the laminations to conform to the circular arrangement of the laminated stator or rotor which results in the low cost and low weight advantages when making either a cylindrical stator or rotor or a conical or tapered stator or rotor to enable adjustment of the air gap by moving the stator or rotor axially relative to each other. This unique use of E-shaped laminations for circular or rotating electrical machinery including the bending modification, either spreading or closing the slots, combined with the unique assembly technique and process for encapsulating the stator or rotor in epoxy material constitutes the essential factors of this invention and enables the wind-powered dynamo illustrated in FIG. 1 to be effectively constructed at a minimum cost.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The method of forming an annular core for an electrical machine component consisting of the steps of stacking a plurality of plate-like E-laminations in aligned relation with each lamination including a web and three legs perpendicular to one edge thereof and opposed parallel flat side surfaces, bending the E-laminations by exerting force on the outer legs while maintaining pressure on the flat surfaces thereof to prevent lateral deflection and deforming the web into arcuate configuration conforming to the curvature of the core being formed, rigidly securing a plurality of the bent and deformed stacks of E-laminations in end-to-end relation to form an annular core, assembling coil windings on the poles formed by the legs of the assembled E-laminations, and encapsulating the coil windings and E-laminations in potting material, said step of rigidly securing the stacks of E-laminations in end-to-end relation including the step of welding backing plates interiorly of the curved edges of the webs of the stacked E-laminations thereby providing a rigid annular core, assembling a central hub with spokes extending therefrom rigidly secured to the backing plates to provide a bearing support for the core.

2. The method as defined in claim 1 wherein the step of encapsulation includes the step of rotatably driving the core while supported by its hub in order to uniformly distribute the potting material by centrifugal force prior to the potting material hardening.

3. The method as defined in claim 1 wherein the width of the outer legs on the E-laminations is one-half the width of the center leg whereby the poles formed by joining two outer legs together are equal in width to the poles defined by the center leg, said step of securing the stacks of E-laminations in end-to-end relation including the step of staggering the joint between the stacks of E-laminations thereby interleaving the stacks of laminations with the seams therebetween being staggered to provide a rigid structure.

4. The method as defined in claim 1 wherein the step of encapsulating the E-laminations and coil windings includes the positioning of an annular ring externally of the core, positioning annular end plates along each side of the core and joining the end plates to the annular ring, rotating the core about its center while placing flowable and hardenable epoxy potting material into the channel-shaped annular member formed by the ring and end plates, and permitting the potting material to harden while being rotated thereby centrifugally distributing the potting material uniformly throughout the portion of the core having the E-laminations and coil windings thereon.

5. The method of forming an annular core for an electrical machine component consisting of the steps of stacking a plurality of plate-like E-laminations in aligned relation with each lamination including a web and three legs perpendicular to one edge thereof and opposed parallel flat side surfaces, bending the E-laminations by exerting force on the outer legs while maintaining pressure on the flat surfaces thereof to prevent lateral deflection and deforming the web into arcuate configuration conforming to the curvature of the core being formed, and rigidly securing a plurality of the bent and deformed stacks of E-laminations in end-to-end relation to form an annular core, said step of rigidly securing the stacks of E-laminations in end-to-end relation including the step of rigidly securing backing plates along the curved edges of the webs of the stacked E-laminations in bridging relation to the joint between adjacent end-to-end stacks thereby providing a rigid annular core.

6. The method as defined in claim 5 in which the width of the outer legs on the E-laminations is one-half the width of the center leg whereby the poles formed by joining two outer legs together are equal in width to the poles defined by the center leg, said step of securing the stacks of E-laminations in end-to-end relation including the step of assembling a plurality of stacks of E-laminations in side-by-side relation, staggering the end-to-end joint between the stacks of E-laminations thereby interleaving the stacks of laminations with the seams therebetween being staggered, and rigidly securing the backing plate to all of the stacks of laminations to provide a rigid core.

* * * * *